United States Patent
Wynblatt et al.

(10) Patent No.: US 6,711,714 B1
(45) Date of Patent: Mar. 23, 2004

(54) LINEARIZATION OF FRAMESETS FOR AUDIBLY RENDERING FRAMES

(75) Inventors: Michael Wynblatt, Pleasant Hill, NJ (US); Stuart Goose, Princeton, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 0 days.

(21) Appl. No.: 09/497,059

(22) Filed: Feb. 2, 2000

(51) Int. Cl.$^7$ ............................................... G06F 17/28
(52) U.S. Cl. ........................ 715/500.1; 379/88.13; 379/88.17
(58) Field of Search ................. 715/500.1; 345/727; 379/88.13, 88.17; 704/271

(56) References Cited

U.S. PATENT DOCUMENTS

| | | | | |
|---|---|---|---|---|
| 5,761,280 A | * | 6/1998 | Noonen et al. | 379/93.27 |
| 5,764,910 A | * | 6/1998 | Shachar | 709/223 |
| 5,809,415 A | * | 9/1998 | Rossmann | 455/422.1 |
| 5,825,854 A | * | 10/1998 | Larson et al. | 379/88.14 |
| 5,953,392 A | | 9/1999 | Rhie et al. | |
| 5,983,184 A | | 11/1999 | Noguchi | |
| 5,983,369 A | | 11/1999 | Bakoglu et al. | |
| 5,987,454 A | | 11/1999 | Hobbs | |
| 6,003,047 A | | 12/1999 | Osmond et al. | |
| 6,006,265 A | | 12/1999 | Rangan et al. | |
| 6,011,537 A | | 1/2000 | Slotznick | |
| 6,243,445 B1 | * | 6/2001 | Begeja et al. | 379/93.01 |
| 6,353,661 B1 | * | 3/2002 | Bailey, III | 379/93.25 |
| 6,366,650 B1 | * | 4/2002 | Rhie et al. | 379/88.13 |

OTHER PUBLICATIONS

Brown, Michael K., et al. "PhoneBrowser: A Web–Content–Programmable Speech Processing Platform," The W3C Workshop o Voice Browsers, Cambridge, MA 1998.*

Goose, Stuart, et al. "1–800–Hypertext: Browsing Hypertext With a Telephone," Proceeding of the Ninth ACM Conference on Hypertext and Hypermedia, Pittsburgh, PA 1998.*

Wynblatt, M. "Browsing the World Wide Web in a Non–Visual Environment," Proceedings of the International Conference on Auditory Display (ICAD), Nov. 1997.*

Wynblatt, M., et al. "Towards Improving Audio Web Browsing," The W3C Workshop on Voice Browsers, Cambridge, MA 1998.*

Youssef, Adel A. "Media Conversion from Visual to Audio–Voice Browsers," University of Maryland Department of Computer Science, Apr. 2000.*

Imperato, Gina "Calling All Web Sites," FastCompany, Issue 06, Dec. 1996/Jan. 1997.*

"Technical Background," The VoiceSML Forum, www.voicexml.org/tech_bkgrnd.html.*

* cited by examiner

*Primary Examiner*—Sanjiv Shah
*Assistant Examiner*—Doug Hutton

(57) ABSTRACT

A method for linearizing framesets for audibly rendering structured document frames, in accordance with the present invention, includes accessing a document including a frameset. Frames of the frameset are ranked in accordance with positional locations of each frame in the frameset such that each frame is uniquely ordered in the frameset. A linearized document is generated for the frameset for rendering by an audio browser.

17 Claims, 5 Drawing Sheets

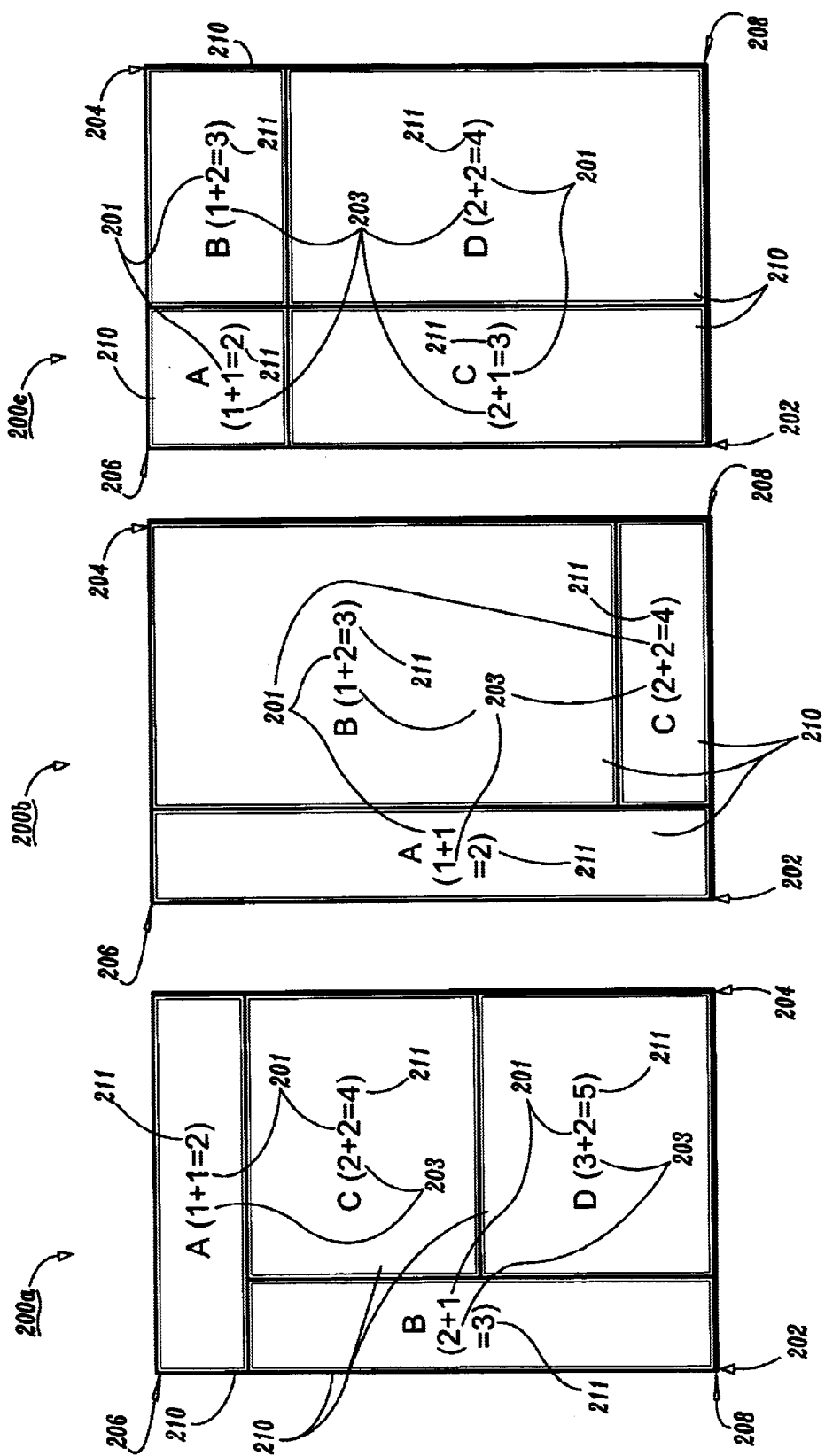

though other views can be scrolled or replaced. For example, within the same window, one frame might display a static banner, a second a navigation menu, and a third the main document that can be scrolled through or replaced by navigating in the second frame. By definition, a frameset (the term used to describe a complex document comprising multiple frames) can be recursive and thus of arbitrary depth, as it in turn may include one or more framesets.

LINEARIZATION OF FRAMESETS FOR AUDIBLY RENDERING FRAMES

BACKGROUND

1. Technical Field

This disclosure relates to organizing framesets and more particularly, to a method for organizing and rendering framesets for browsing the Internet.

2. Description of the Related Art

The World Wide Web (WWW) has enjoyed phenomenal growth over recent years and now accounts for a significant portion of all Internet traffic. The unmitigated success of the WWW bears testimony to the previously unsatisfied need for a system able to integrate and deliver distributed information. The profile of hypermedia has been raised significantly by the WWW, which has endorsed hypermedia as an appropriate technology for accessing and navigating information spaces. Users can access a wealth of information and associated services over the WWW, ranging from, for example, international news to local restaurant menus.

Interactive voice browsers that make extensive use of speech synthesis and recognition offer an alternative paradigm that enables both sighted and visually impaired users to access the WWW. Interactive voice browsers afford ubiquitous mobile access to the WWW using a wide range of consumer devices in addition to the desktop PC. As such, interactive voice browsers can facilitate a safe, hands-free browsing environment, which is of importance to categories of users such as car drivers and various mobile and technical professionals. However, organizing and rendering the hypertext frames or framesets remains difficult for interactive voice browsers. In addition, voice browsers are unable to process and render a significant number of complex HTML document framesets published on the WWW.

Therefore, a need exists for a method for organizing and ordering framesets on the Internet for audio rendering.

SUMMARY OF THE INVENTION

A method for linearizing framesets for audibly rendering structured document frames, in accordance with the present invention, includes accessing a document including a frameset. Frames of the frameset are ranked in accordance with positional locations of each frame in the frameset such that each frame is uniquely ordered in the frameset. A linearized document is generated for the frameset for rendering by an audio browser.

Another method for linearizing framesets for audibly rendering structured document frames, includes the steps of downloading a structured document including a frameset, ranking frames of the frameset in accordance with positional locations of each frame in the frameset, sorting the frames of the frame set by ordering the frames based on their relative positions in the frameset such that each frame is uniquely ordered in the frameset and generating a linearized document for the ordered frameset for rendering by an audio browser.

In other methods, the document may include a structured document such as, for example, a Hypertext Markup Language (HTML) document. The step of accessing a document including at least one frameset may include the step of downloading the document from the Internet. The step of ranking frames of the frameset in accordance with positional locations of each frame in the frameset such that each frame is uniquely ordered in the frameset may include the step of ranking the frames based on their relative position. The step of ranking frames of the frameset in accordance with positional locations of each frame in the frameset such that each frame is uniquely ordered in the frameset may include the steps of ranking the frames based on their relative position from a first location to obtain a first index, ranking the frames based on their relative position from a second location to obtain a second index and summing the first and second indices to achieve a final ranking. The method may further include the step of ordering frames having equal indices as a result of the step of summing the first and second indices by providing resolution criteria. The audio browser may include one of a telephone, a computer and a personal digital assistant.

The above methods and method steps may be performed by employing a program storage device readable by machine, tangibly embodying a program of instructions executable by the machine to perform the method steps.

These and other objects, features and advantages of the present invention will become apparent from the following detailed description of illustrative embodiments thereof, which is to be read in connection with the accompanying drawings.

BRIEF DESCRIPTION OF DRAWINGS

This disclosure will present in detail the following description of preferred embodiments with reference to the following figures wherein:

FIGS. 3–5 illustratively show frames of framesets ranked in accordance with the present invention;

DETAILED DESCRIPTION OF PREFERRED EMBODIMENTS

Figure 1:
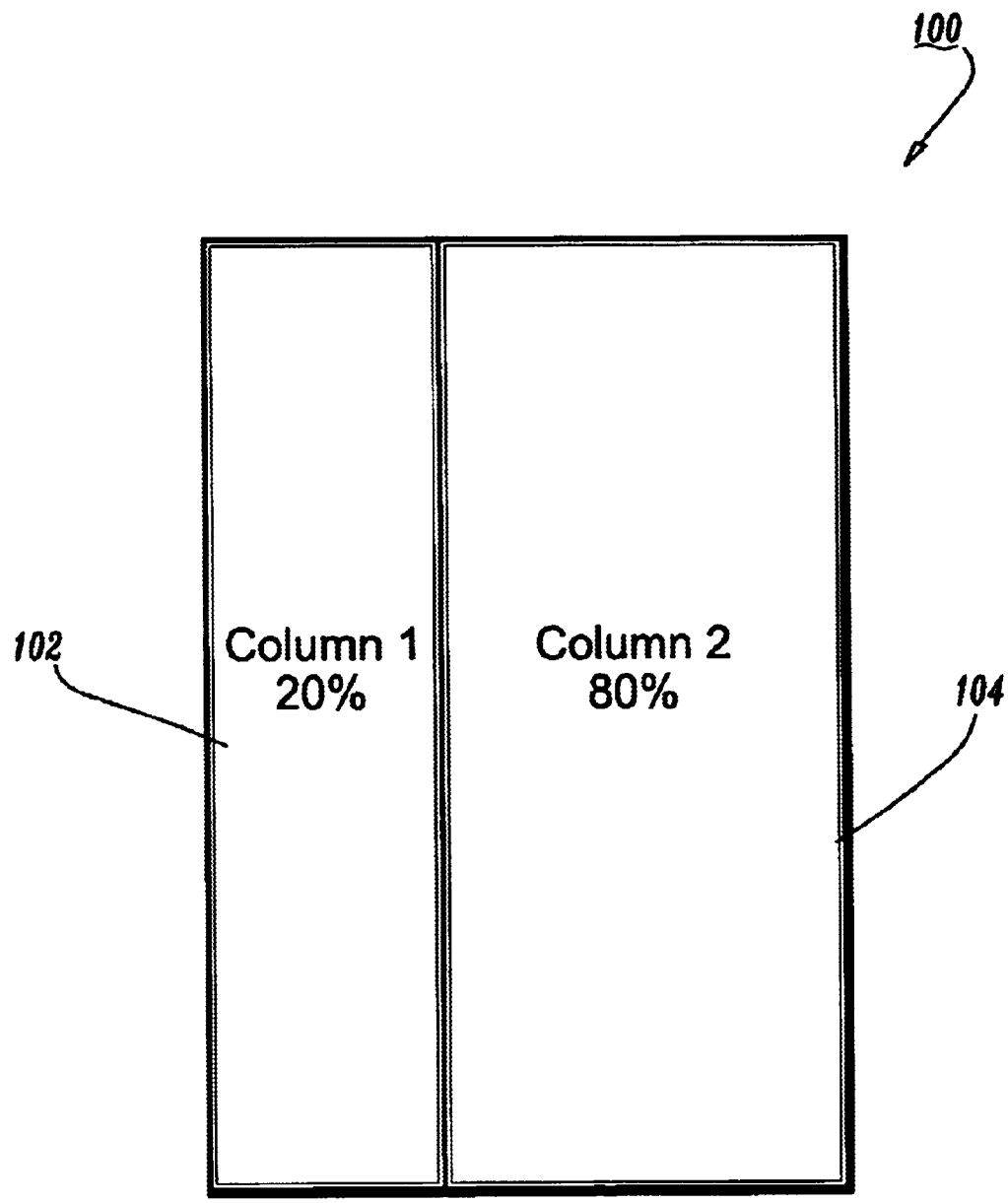
FIG. 1 is an illustrative browser display showing a frameset including frames for employing the present invention.

The present invention provides a method and apparatus for organizing and rendering framesets for interactive voice or audio browsers. The present invention includes a method for organizing or linearizing framesets to provide a more repeatable and organized way for audio browsing of the Internet.

In recent versions of the Hypertext Markup Language (HTML), a mechanism called frames has been introduced. HTML frames permit authors to present documents in multiple views, which may be independent windows or sub-windows. Multiple views provide designers with a way to keep certain information visible, while other views can be scrolled or replaced. For example, within the same window, one frame might display a static banner, a second a navigation menu, and a third the main document that can be scrolled through or replaced by navigating in the second frame. By definition, a frameset (the term used to describe a complex document comprising multiple frames) can be recursive and thus of arbitrary depth, as it in turn may include one or more framesets.

The present invention describes a method for analyzing a document frameset and the generating of an intuitive corresponding linearization of such a complex document. This linearized version of the document is then in a suitable form to be rendered by a voice or audio browser. A voice browser, which may be employed by the present invention, is disclosed in a commonly assigned, copending application, Ser. No. 08/768,046, filed Dec. 13, 1996 and incorporated herein by reference. This voice browser facilitates the browsing of WWW documents.

It should be understood that the elements shown in the FIGS. may be implemented in various forms of hardware, software or combinations thereof. Preferably, these elements are implemented in software on one or more appropriately programmed general purpose digital computers having a processor and memory and input/output interfaces. Referring now in specific detail to the drawings in which like reference numerals identify similar or identical elements throughout the several views, and initially to FIG. 1, an illustrative frameset 100 for a video browser is shown indicating positions for frames 102 and 104. A visual WWW browser will download and interpret an HTML code for displaying frames 102 and 104. For example, HTML code for frames 102 and 104 may include:

<frameset cols=@20%,80%@>
    <frame src=@col1.html@>
    <frame src=@col2.html@>
    </frameset>
    . . .

The associated HTML documents will be presented in two windows as shown in FIG. 1. The HTML in FIG. 1 declares a frameset with two columns, with the left column (frame 102) occupying 20% of the space and the right column (frame 104) occupying 80%. Frames 102 and 104 are populated by the two HTML files col1.html and col2.html, respectively.

Figure 2:
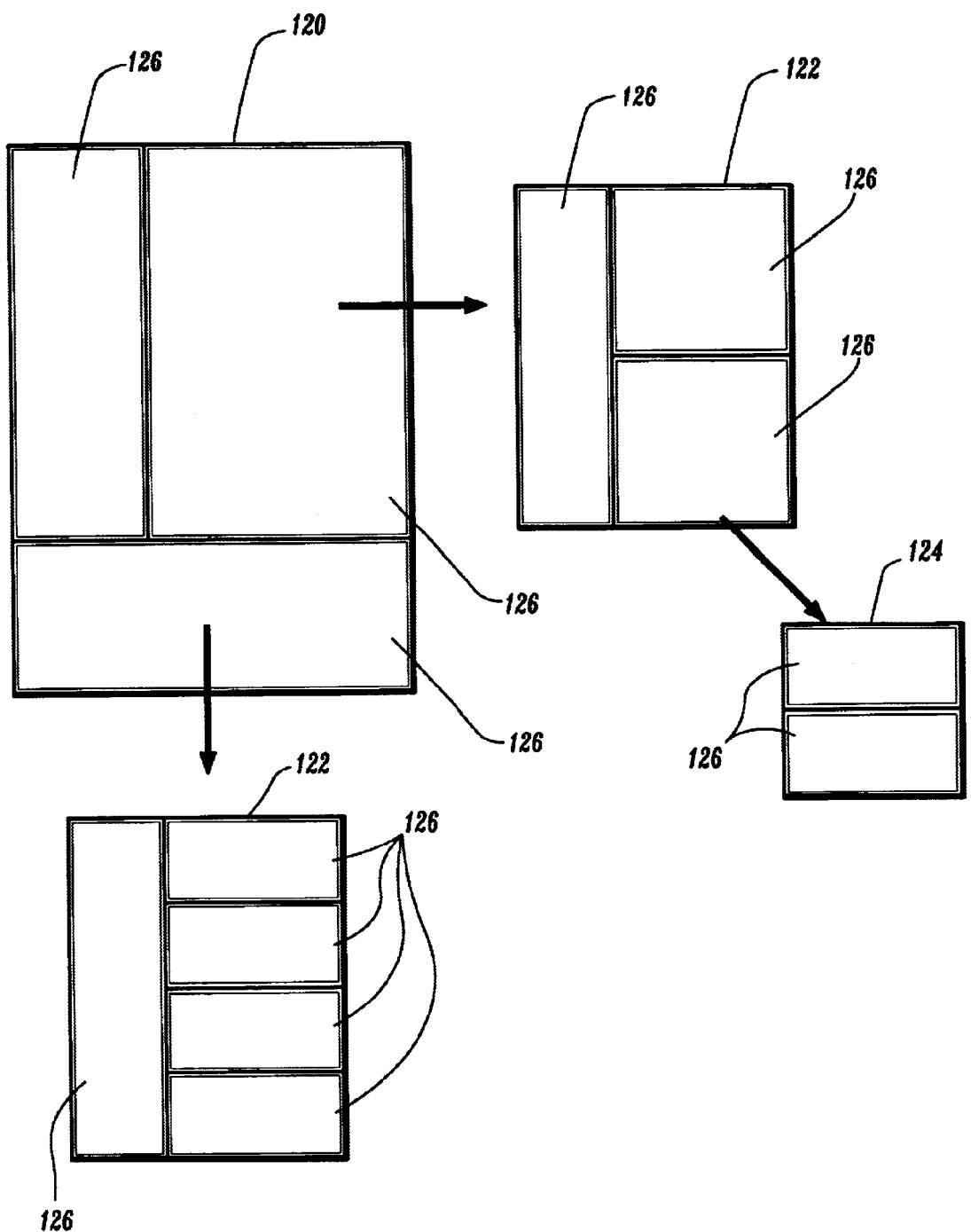
FIG. 2 depicts nested framesets and frames on which the present invention may be applied.

An HTML frameset can be recursive, thus frames within one frameset may reference HTML documents that, in turn, specify one or more framesets. In addition, an HTML document may be nested to an arbitrary depth, but in practice HTML pages have a depth of nesting of a few levels, for example, two or three levels, as schematically show in FIG. 2. In FIG. 2, frameset 120 has nested framesets 122 one of which includes frameset 124. Framesets 120, 122 and 124 may also include individual frames 126 as well.

Once an HTML document has been downloaded by, for example, a computer accessing a web page over the Internet or other network, an HTML parser analyzes the document. If it is recognized that this HTML document includes one or more frames, the parser requests that these HTML frame documents are also downloaded. This process is repeated recursively until each frame document has been downloaded and analyzed. In accordance with the present invention, criteria for selecting a linear sequence in which these frames will be rendered will now be illustratively described.

By the present invention, an arbitrarily complex HTML frameset document can be linearized or ordered by analyzing the positions at which the frames are designated to appear. Frames are advantageously ranked using their positions, areas or other hierarchical criteria or status to place them in a linear order in which the frames may be rendered. This is particularly useful for voice or audio browsers.

In one illustrative embodiment, a placement order of an HTML document is employed to rank or linearize frames. Referring to FIGS. 3, 4 and 5, examples of a frame ranking method are shown. In these examples, an order ranking or horizontal ranking 201 from left margins 202 of frames 210 of documents 200a–c to right margins 204 is given. Then, an order ranking or vertical ranking 203 is given from a top 206 of the documents 200a–c to a bottom 208. In this embodiment, frame size is ignored, as only these order values are considered important. Other criteria for ranking frames are also contemplated.

Summations of horizontal and vertical rankings 201 and 203 for each frame 210 produces a final sequence number 211. Advantageously, each frame 210 has a final sequence number 211 which provides a ranking. Final sequence numbers 211 which are equal may be resolved for ordering by taking a lowest horizontal ranking (or, alternatively a lowest vertical ranking or other criteria). In this way, frames 210 are given a unique order as indicated by letters (e.g., A, B, C and D)in FIGS. 3–5.

The criteria provided for rankings as described above can be applied to produce a linear sequence in which the document can be rendered. In each example (e.g., FIGS. 3–5), the voice browser would render the frame according to its alphabetical ranking.

Figure 6:
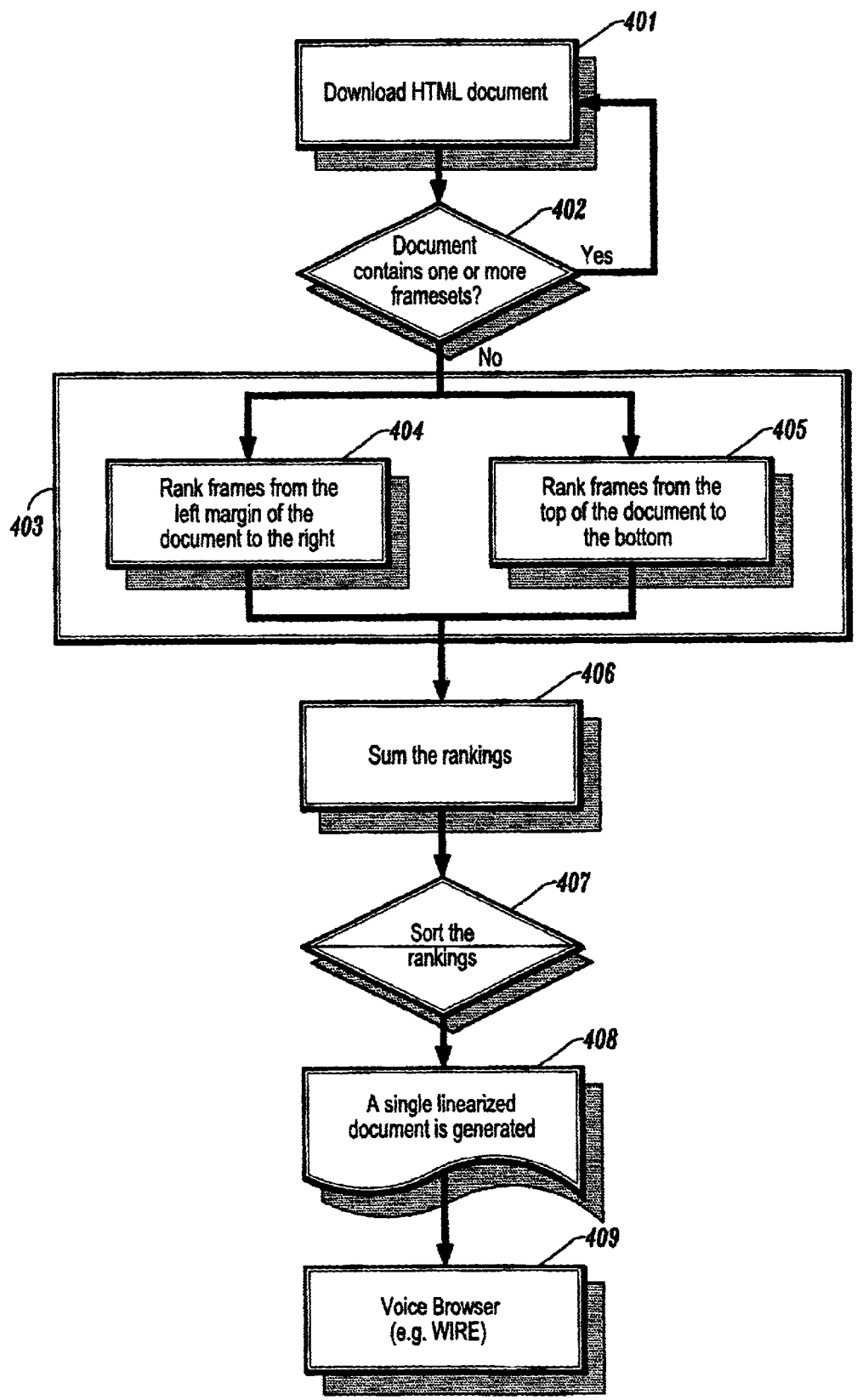
FIG. 6 is a flow/block diagram of a method/apparatus for generating a rendering of a structured document in accordance with the present invention.

Referring to FIG. 6, a flow diagram of a method for rendering document framesets by downloading a document, parsing, ranking and producing a linearized version of the document is shown. The document preferably includes an HTML document; however, other structured documents may be employed as well. For example, structural documents may include but are not limited to XML, LaTex™, .RTF, HDML and/or SGML formats. By structured documents, it is meant that the document's content and structural information are mixed freely and that all of the documents to be rendered need not have a same or even similar structure. The present invention may be employed with arbitrary types of documents or non-text media, for example, audio streams, audio files, etc.

In block 401, a document requested is accessed or downloaded from a remote computer. The document is preferably an HTML document and the remote computer may include a remote Web server. The document may be downloaded to a computer, a personal digital assistant, a telephone (e.g., a cellular telephone), a television (e.g., connected to the Web) or any other device capable of downloading a document. In block 402, the document is analyzed to evaluate whether the document includes references to one or more frames (or framesets). If true, then these documents are also downloaded in block 401. This process is repeated recursively until each frame document has been downloaded and analyzed.

In block 403, a position at which each frame is designated to appear is then analyzed. In block 404, the frames are ranked in order from the left margin of the document to the right. While in block 405, the frames are ranked in order from the top of the document to the bottom. Other rankings may also be employed for ordering frames in block 403 as described above.

In block 406, for each frame, the rankings from blocks 404 and 405 are summed, to produce a final ranking. The final rankings are then sorted into ascending order, in block 407, in accordance with the final ranking and/or other criteria, such as for example, placement order, size, shape, etc. or as discussed above, rules for resolving rankings of equal value. The final ranking may advantageously be provided in such a way as to represent the relative positions of frames in a frameset (e.g., place value of frames). A single linearized version of the HTML frameset document is produced in block 408. The linearized version may include a compiled document which has code reordered in accordance with the ranking of frames or simply "points" to addresses of a next frame to be rendered. This linearized version of the document is input to a voice browser or audio browser in block 409. A voice browser which may be employed by the present invention is disclosed in application, Ser. No. 08/768,046, filed Dec. 13, 1996 and previously incorporated herein by reference. This voice browser facilitates the browsing of WWW documents by audibly rendering documents. This is particularly useful for interactively browsing the Internet, other networks or interfacing with a remote computer by telephone or other interactive audio devices.

Figure 7:
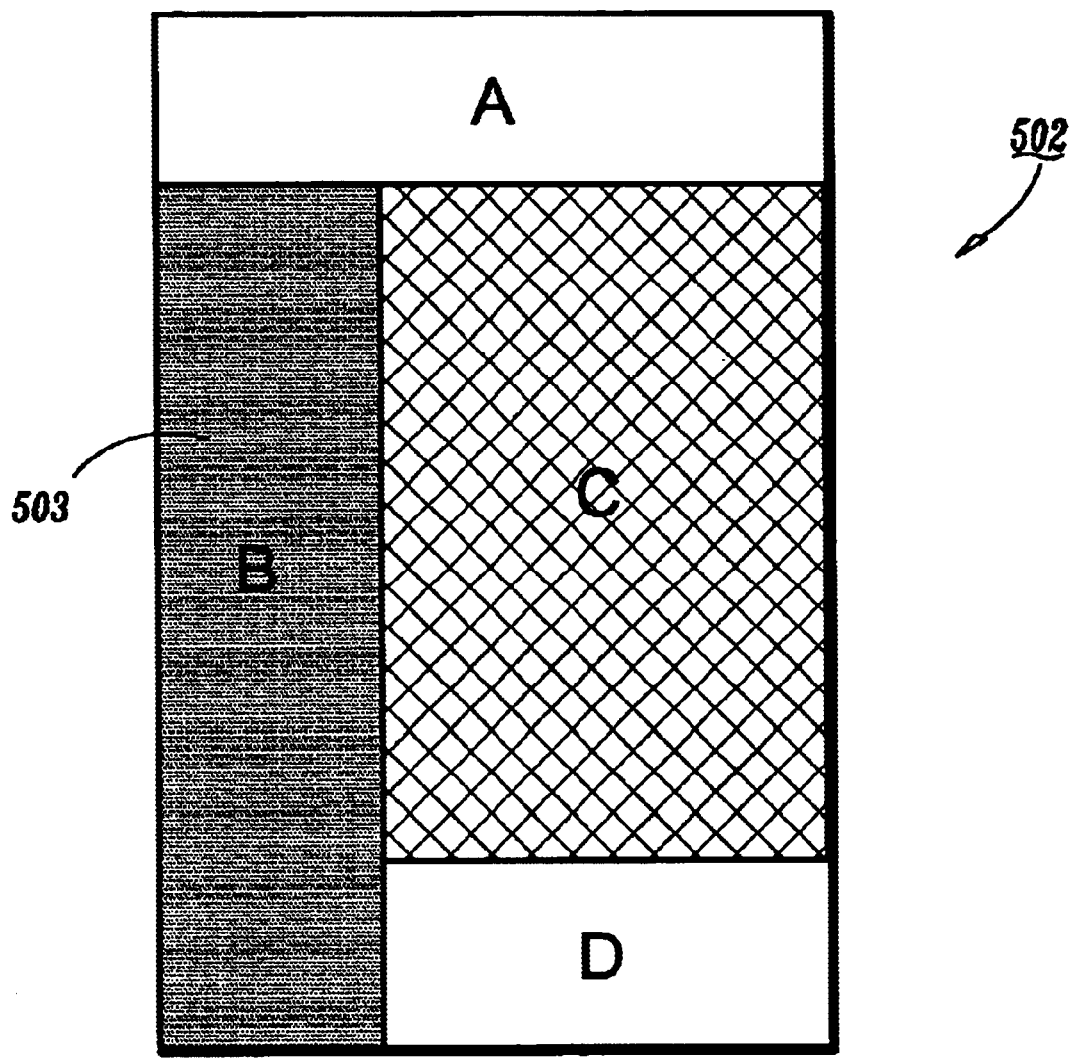
FIG. 7 depicts a frameset to demonstrate the operation of the present invention when a frame is replaced in accordance with the present invention.

Referring to FIG. 7, a frameset 502 is shown for illustrating the replacement of the content of a frame in accordance with the invention. A link 503 located in frame B causes the contents of frame C to be replaced with another document of file (e.g., an HTML file). HTML document authors can design HTML framesets in which hyperlinks located in one frame (e.g., frame B in FIG. 7) are activated and cause the contents of another frame (e.g., frame C in FIG. 7) to be replaced with a new HTML file.

The example in FIG. 7 is an approach model often employed by, HTML document authors to offer a menu using one or more hyperlinks in frame B which, when selected, renders the corresponding HTML content in frame C. When the user activates a hyperlink, such as hyperlink 503 in frame B, the voice browser informs the user that it is jumping to the new location (in this example, to frame C) and that the new HTML document for frame C is being downloaded. The method described in FIG. 6 is then followed once again. On completion of these actions, the voice browser commences rendering from the destination location of the link (usually the beginning of the document) within frame C.

Interactive voice browsing offers an alternative paradigm that enables both sighted and visually impaired users to access the WWW. Interactive voice browsers afford ubiquitous mobile access to the WWW using a wide range of consumer devices in addition to the desktop PC. As such, interactive voice browsers can facilitate a safe, hands-free browsing environment, which is of importance to categories of users such as car drivers and various mobile and technical professionals.

Prior to the invention, voice browsers could not process and render a significant number of complex HTML document framesets published on the WWW. The present invention discloses methods for analyzing a document frameset and the generation of an intuitive corresponding linearization of such a complex document. This linearized version of the document is then in a suitable form to be rendered by a voice browser.

Having described preferred embodiments for linearization of framesets for audibly rendering frames (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for linearizing framesets for audibly rendering structured document frames, comprising the steps of:
   accessing a document including a frameset;
   ranking frames of the frameset in accordance with positional locations of each frame in the frameset such that each frame is uniquely ordered in the frameset;
   ranking the frames based on their relative position from a first location to obtain a first index;
   ranking the frames based on their relative position from a second location to obtain a second index;
   summing the first and second indices to achieve a final ranking; and
   generating a linearized document for the frameset for rendering by an audio browser.

2. The method as recited in claim 1, wherein the document includes a structured document.

3. The method as recited in claim 1, wherein the document includes a HTML document.

4. The method as recited in claim 1, wherein the step of accessing a document including at least one frameset includes the step of downloading the document from the Internet.

5. The method as recited in claim 1, further comprising the step of ordering frames having equal indices as a result of the step of summing the first and second indices by providing resolution criteria.

6. The method as recited in claim 1, wherein the audio browser includes one of a telephone, a computer and a personal digital assistant.

7. A program storage device readable by machine, tangibly embodying a program of instructions executable by the machine to perform method steps for linearizing framesets for audibly rendering structured document frames, the method steps comprising:
   accessing a document including at least one frameset;
   ranking frames of the frameset in accordance with positional locations of each frame in the frameset such that each frame is uniquely ordered in the frameset;
   ranking the frames based on their relative Position from a first location to obtain a first index;
   ranking the frames based on their relative position from a second location to obtain a second index;
   summing the first and second indices to achieve a final ranking; and
   generating a linearized document for the frameset for rendering by an audio browser.

8. The program storage device as recited in claim 7, wherein the document includes a structured document.

9. The program storage device as recited in claim 7, wherein the document includes a HTML document.

10. The program storage device as recited in claim 7, wherein the step of accessing a document including at least one frameset includes the step of downloading the document from the Internet.

11. The program storage device as recited in claim 7, further comprising the step of ordering frames having equal indices as a result of the step of summing the first and second indices by providing resolution criteria.

12. The program storage device as recited in claim 7, wherein the audio browser includes one of a telephone, a computer and a personal digital assistant.

13. A method for linearizing framesets for audibly rendering structured document frames, comprising the steps of:
   downloading a structured document including a frameset;
   ranking frames of the frameset in accordance with positional locations of each frame in the frameset;
   ranking the frames based on their relative position from a first location to obtain a first index;
   ranking the frames based on their relative position from a second location to obtain a second index;
   summing the first and second indices to achieve a final ranking;

sorting the frames of the frame set by ordering the frames based on their relative positions in the frameset such that each frame is uniquely ordered in the frameset; and generating a linearized document for the ordered frameset for rendering by an audio browser.

14. The method as recited in claim 13, wherein the structured document includes a HTML document.

15. The method as recited in claim 13, wherein the structured document is downloaded from the Internet.

16. The method as recited in claim 13, further comprising the step of ordering frames having equal indices as a result of the step of summing the first and second indices by providing resolution criteria.

17. The method as recited in claim 13, wherein the audio browser includes one of a telephone, a computer and a personal digital assistant.

* * * * *